(12) United States Patent
Muñiz Casais et al.

(10) Patent No.: US 10,840,753 B2
(45) Date of Patent: Nov. 17, 2020

(54) MAGNET MODULE AND ELECTRICAL MACHINE

(71) Applicant: GE RENEWABLE TECHNOLOGIES WIND B.V., PA Breda (NL)

(72) Inventors: César Muñiz Casais, Barcelona (ES); Julio César Urresty, Barcelona (ES); Adrian Bueno De Santiago, Barcelona (ES)

(73) Assignee: GE Renewable Technologies Wind B.V., Breda (NL)

( * ) Notice: Subject to any disclaimer, the term of this patent is extended or adjusted under 35 U.S.C. 154(b) by 162 days.

(21) Appl. No.: 15/995,366

(22) Filed: Jun. 1, 2018

(65) Prior Publication Data

US 2018/0351425 A1  Dec. 6, 2018

(30) Foreign Application Priority Data

Jun. 6, 2017  (EP) .................... 17382338

(51) Int. Cl.
*H02K 1/27* (2006.01)
*H02K 21/16* (2006.01)
(Continued)

(52) U.S. Cl.
CPC .............. *H02K 1/27* (2013.01); *H02K 1/02* (2013.01); *H02K 1/2766* (2013.01); *H02K 1/28* (2013.01);
(Continued)

(58) Field of Classification Search
CPC .......... H02K 1/02; H02K 1/27; H02K 1/2766; H02K 1/28; H02K 1/32; H02K 21/16; H02K 2213/12; H02K 4/1838
(Continued)

(56) References Cited

U.S. PATENT DOCUMENTS

2006/0170301 A1* 8/2006 Masuzawa ............. H02K 1/276
    310/156.53
2011/0163624 A1   7/2011 Hori et al.
    (Continued)

FOREIGN PATENT DOCUMENTS

| FR | 3018009 A1 | 8/2015 |
| JP | 2015-039297 A | 2/2015 |
| WO | 2014/065102 A1 | 5/2014 |

OTHER PUBLICATIONS

Extended European Search Report and Opinion issued in connection with corresponding EP Application No. 17382338.6 dated Dec. 14, 2017.

*Primary Examiner* — Tulsidas C Patel
*Assistant Examiner* — Rashad H Johnson
(74) *Attorney, Agent, or Firm* — Dority & Manning, P.A.

(57) ABSTRACT

A permanent magnet module for an electrical machine extending along an axial direction is provided. The permanent magnet module comprises a permanent magnet assembly comprising at least one permanent magnet and a base supporting at least part of the permanent magnet assembly and extending from a bottom adapted to be positioned on a rotor of an electrical machine to a top along a radial direction. The permanent magnet assembly further comprises a first inclined permanent magnet portion and a second inclined permanent magnet portion arranged outwardly inclined along the radial direction and a tangential permanent magnet portion arranged substantially perpendicular to the radial direction.

19 Claims, 4 Drawing Sheets

(51) Int. Cl.
*H02K 1/02* (2006.01)
*H02K 1/32* (2006.01)
*H02K 1/28* (2006.01)
*H02K 7/18* (2006.01)

(52) U.S. Cl.
CPC .............. *H02K 1/32* (2013.01); *H02K 21/16* (2013.01); *H02K 7/1838* (2013.01); *H02K 2213/12* (2013.01)

(58) Field of Classification Search
USPC ............ 310/156.01, 156.08, 156.19, 156.33, 310/156.48, 156.49
See application file for complete search history.

(56) References Cited

U.S. PATENT DOCUMENTS

| | | | |
|---|---|---|---|
| 2011/0204741 A1* | 8/2011 | Hsu ..................... | H02K 1/2766 310/156.53 |
| 2011/0285216 A1* | 11/2011 | Kurronen ................. | H02K 1/28 310/45 |
| 2012/0133230 A1* | 5/2012 | Jansen ................. | H02K 1/2766 310/156.12 |
| 2014/0084720 A1* | 3/2014 | Claramunt Estecha ..................... | H02K 1/2766 310/58 |
| 2015/0042099 A1* | 2/2015 | Muniz Casais ...... | H02K 1/2773 290/55 |
| 2015/0048620 A1 | 2/2015 | Muniz Casais et al. | |
| 2015/0061427 A1* | 3/2015 | Vartiainen ................ | H02K 1/28 310/59 |
| 2015/0372547 A1 | 12/2015 | Kifuji et al. | |

\* cited by examiner

MAGNET MODULE AND ELECTRICAL MACHINE

FIELD OF INVENTION

The present disclosure relates to a permanent magnet module for an electrical machine, and further relates to an electrical machine.

BACKGROUND OF THE INVENTION

Electrical machines, such as motors and generators, generally comprise a rotor structure and a stator structure. In case of permanent magnet excited generators (PMG), permanent magnets (PM) are generally comprised in the rotor (although they could also be arranged alternatively in the stator structure), whereas winding elements (e.g. coils) are usually included in the stator (although they could alternatively be arranged in the rotor structure). Permanent magnet generators are generally deemed to be reliable and require less maintenance than other generator typologies.

In this way, permanent magnet generators may be used for example in wind turbines, in particular in offshore wind turbines. Wind turbines generally comprise a rotor with a rotor hub and a plurality of blades. The rotor is set into rotation under the influence of the wind on the blades. The rotation of the rotor shaft either directly drives the generator rotor ("directly driven") or through the use of a gearbox. Such a direct drive wind turbine generator may have e.g. a diameter of 6-8 meters (236-315 inches), a length of e.g. 2-3 meters (79-118 inches) and may rotate at low speed, for example in the range of 2 to 20 rpm (revolutions per minute). Alternatively, permanent magnet generators may also be coupled to a gearbox which increases the rotational speed of the generator to for example between 50 to 500 rpm or even more.

Permanent magnets may be provided in permanent magnet modules, which may be attached to the rotor as a single item. A permanent magnet module may be defined as a unit having a plurality of permanent magnets, such that the plurality of magnets can be mounted to and unmounted together from a rotor of an electrical machine. Such a module may have a module base with a shape suitable for housing a plurality of permanent magnets that may be fixed to the base. The base may be configured to be fixed to a rotor rim in such a way that the plurality of magnets are fixed together to the rotor rim through the module base. The use of permanent magnet modules may thus facilitate the manufacturing of a rotor.

Permanent magnet modules may have a module base formed as a stack of metal sheets which may be separated from each other by means of electrically insulating material. With this feature, magnetic losses, for example eddy currents, might be reduced in the corresponding electrical machine such that its efficiency may be improved.

Permanent magnets of direct drive offshore wind turbines are generally arranged on the permanent magnet module in a flat configuration or in V-shape configuration. However, these magnet configurations are not limited to generators in direct drive offshore applications and not even to the field of wind turbines only. In such a way, generators of considerable dimensions that may have similar configurations may also be found e.g. in steam turbines and water turbines.

In flat configurations, the permanent magnets are mounted parallel with the respect a radial direction, i.e. the direction extending radially from the center of the rotor to the module, on a flat or tangential surface of the base. Magnets are generally glued to the base and may be additionally covered by a plate to improve the fixation to the base. All the magnets of a module typically have the same magnetic orientation, i.e. the North of all the magnets face towards the stator, and the magnetic orientation of the neighboring module is the opposite, as to have a radial magnetic configuration. Compared to other configurations, in flat or tangential configurations the area of the permanent magnets is generally bigger. However, permanent magnets may be occasionally detached from the base due to adhesive failure, especially in applications having a long life expectancy or working in a corrosive atmosphere as for example in wind turbines, in particular in offshore wind turbines.

In magnet modules having a V-shape configuration, the magnet modules are arranged inclined with respect to the radial direction, i.e. the direction extending radially from the center of the rotor to the module. In these configurations, magnets may be embedded in the base or clamped between the base and a central support fixed to the base. In these configurations, the permanent magnets may have a circumferential magnetic orientation (also sometimes referred to as "transversal" or "tangential" flux orientation). Magnetic flux may be more efficient in V-shape configurations since the flux is more concentrated. However, such configurations generally require more space and may thus have a lower utilization of the module.

The present disclosure provides examples of systems that at least partially resolve some of the aforementioned disadvantages.

SUMMARY OF INVENTION

In a first aspect, a permanent magnet module for an electrical machine extending along an axial direction is provided. The permanent magnet module comprises a permanent magnet assembly comprising at least one permanent magnet and a base supporting at least part of the permanent magnet assembly and extending from a bottom adapted to be positioned on a rotor of an electrical machine to a top along a radial direction. The permanent magnet assembly further comprises a first inclined permanent magnet portion and a second inclined permanent magnet portion arranged outwardly inclined along the radial direction and a tangential permanent magnet portion arranged substantially perpendicular to the radial direction.

In this aspect, the concentration of the magnetic flux may be enhanced and the magnetic efficiency may thus be improved in comparison to V-shape configurations and the module is more compact. Therefore, the output energy (electrical or rotational) may be increased or the size of the electrical machine may be reduced if the output energy is maintained due to that less magnet modules would be required.

BRIEF DESCRIPTION OF THE DRAWINGS

Non-limiting examples of the present disclosure will be described in the following, with reference to the appended drawings, in which.

DETAILED DESCRIPTION

In these figures the same reference signs have been used to designate matching elements.

Figure 1:
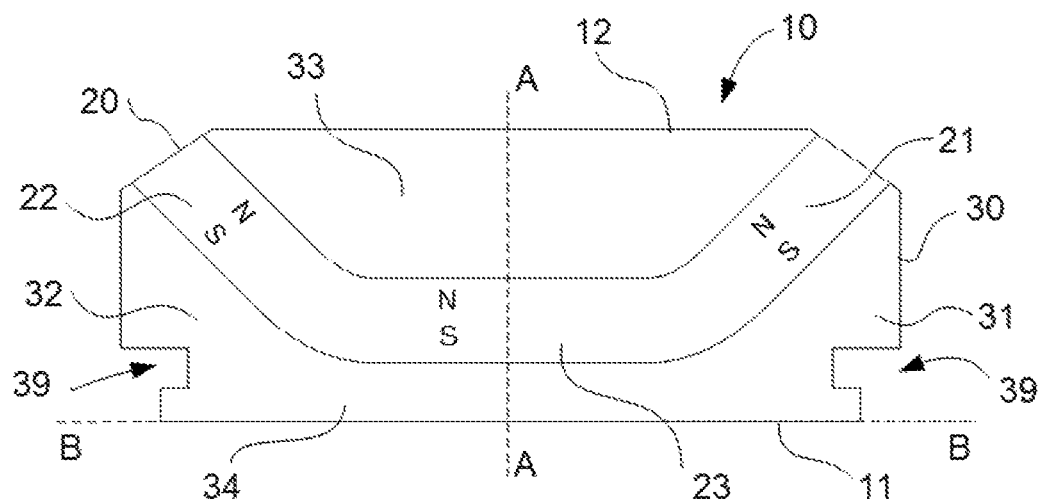
FIG. 1 schematically shows an axial cross-section of a permanent magnet module in accordance to one example.

FIG. 1 schematically shows an axial cross-section of a permanent magnet module in accordance with one example. FIG. 1 shows a permanent magnet module 10 for an electrical machine extending along an axial direction. The module 10 comprises a permanent magnet assembly 20 comprising at least one permanent magnet and a base 30 supporting at least part of the permanent magnet assembly 20. The base 30 extends from a bottom 11 adapted to be positioned on a rotor of an electrical machine (not shown) to a top 12 along a radial direction (along line A-A in this example). The permanent magnet assembly 20 comprises a first inclined permanent magnet portion 21 and a second inclined permanent magnet portion 22 arranged outwardly inclined along the radial direction and a tangential permanent magnet portion 23 arranged substantially parallel to a tangential direction (along the line B-B in this example), the tangential direction being substantially perpendicular to the radial direction.

Herein, an axial cross-section may be defined as the cross-section with a plane that is perpendicular to the rotational axis of the rotor and the rotational axis extends along the axial direction of the electrical machine, i.e. the plane defined by a radial direction (along line A-A in this example) and a tangential direction (along line B-B in this example).

In the example of FIG. 1, the permanent magnet assembly 20 comprises a single permanent magnet in an axial cross-section including the tangential permanent magnet portion 23 and the first inclined permanent magnet portion 21 and the second inclined permanent magnet portion 22. In some examples, the permanent magnet module may comprise at least two permanent magnet assemblies consecutively arranged along the axial direction. The permanent magnet assembly 20 may thus have a substantially V shape having two inclined permanent magnet portion and a tangential permanent magnet portion. The permanent magnet may be formed by for example machining.

In other examples, the permanent magnet assembly 20 may comprise several smaller permanent magnets arranged from the first inclined permanent magnet portion 21 to the second inclined permanent magnet portion 22. In this way, each of the first 21 and the second inclined permanent magnet portion 22 and tangential permanent magnet portion 23 may be formed by several smaller permanent magnets. The permanent magnets may be continuously distributed from the first 21 to the second inclined permanent magnet portion 22 or separated by for example the base or by cooling channels.

In some examples, the base 30 may comprise an upper pole piece 33 and a first lateral wing 31 and a second lateral wing 32. The permanent magnet assembly may be arranged between the upper pole piece 33 and the first lateral wing 31 and the second lateral wing 32.

In some examples, the upper pole piece 33 may have a substantially trapezoidal axial cross-section comprising a long side parallel to a short side and a first lateral side and a second lateral side connecting the long side to the short side. In this way, the long side is on the stator side while the short side is on the rotor side when the module is mounted on a rotor of an electrical machine. In this example, the tangential permanent magnet portion 23 is attached to the short side of the upper pole piece, the first inclined permanent magnet portion 21 is attached to the first lateral side of the upper pole piece and the second inclined permanent magnet portion 22 is attached to the second lateral side of the upper pole piece.

In some examples, the first lateral wing 31 may be connected to the upper pole piece 33 through the first lateral inclined permanent magnet portion 21 and the second lateral wing 32 may be connected to the upper pole piece 33 through the second lateral inclined permanent magnet portion 22.

In some examples, the first lateral wing 31 and the second lateral wing 32 may have a substantially right triangular cross-section. In this aspect, the first inclined permanent magnet portion 21 of the permanent magnet assembly may be arranged between the inclined side of the first lateral wing 31 and one of the inclined side of the upper pole piece 33, and the second inclined permanent magnet portion 22 of the permanent magnet assembly may be arranged between the inclined side of the second lateral wing 32 and the other one of the inclined side of the upper pole piece 33.

The first inclined permanent magnet portion 21 of the permanent magnet assembly may be attached to the inclined side of the first lateral wing 31 and to the first inclined side of the upper pole piece 33, and the second inclined permanent magnet portion 22 of the permanent magnet assembly may be attached to the inclined side of the second lateral wing 32 and to the second inclined side of the upper pole piece 33. Such an attachment may be for example by gluing or bonding.

In addition, the first lateral wing 31 may be connected to the upper pole piece 33 through the first inclined permanent magnet portion 21 of the permanent magnet assembly and the second lateral wing 32 may be connected to the upper pole piece 33 through the second inclined permanent magnet portion 22. In this way, the upper pole piece 33 and the first 31 and the second lateral wings 32 are not integrally formed. Specifically, the upper pole piece may comprise laminated steel and the first lateral wing and the second lateral wing may comprise carbon steel. In other examples, the base may be formed by a single body or by a plurality of axially joined steel stacks.

In some examples, the first lateral wing 31 and the second lateral wing 32 may additionally comprise a protrusion at the end of the surfaces contacting the magnet assembly that are formed to mechanically retain the magnets.

Inclination of the first inclined permanent magnet portion 21 and the second inclined permanent magnet portion 22 with respect to the corresponding local radial plane (along line A-A) may vary. The angle of inclination with respect to the radial plane may be in the range of 5°-85°, specifically in the range of 20°-70°, and more specifically between 30° and 60°. The first inclined permanent magnet portion 21 and the second inclined permanent magnet portion 22 may be arranged outwardly inclined along the radial direction, in such that the first and the second inclined permanent magnet portions form substantially a V.

In some examples, specifically in relatively flat permanent magnet modules, i.e. permanent magnet modules having a relatively short distance from the bottom to the top, the angle of inclination of the first inclined permanent magnet portion and of the inclined permanent magnet portion with respect to the radial plane may be in the range of 45°-85°, specifically in the range of 55°-85°. In these examples, the height of the permanent magnet module may be in the range of 40-80 mm (1.57-3.15 inches) and the width in the tangential direction may be in the range of 150-400 mm (5.91-15.75 inches). In this way, the tangential permanent magnet portion may have a width in the tangential direction of between 20-200 mm (0.79-7.87 inches) and the first inclined permanent magnet portion and the second inclined permanent magnet portion may have a width of between 75-250 mm (2.95-9.84 inches).

In other examples, specifically in permanent magnet modules that are relatively high, i.e. a relatively long distance from the bottom to the top of the permanent magnet module, the angle of inclination with respect to the radial plane may be in the range of 15°-55°, specifically in the range of 25°-45°. In these examples, the height of the permanent magnet module may be in the range of 80-150 mm (3.15-5.91 inches) and the width in the tangential direction may be in the range of 150-400 mm (5.91-15.75 inches). In this way, the tangential permanent magnet portion may have a width in the tangential direction of between 20-100 mm (0.79-3.94 inches) and the first permanent magnet portion and the second permanent magnet portion may have a width of between 50-150 mm (1.97-5.91 inches).

In some examples, the base 30 may comprise a foot 34 connecting the first 31 and the second lateral wings 32. In this way, the structural integrity of the base may be improved. In some examples, the lateral wings and the upper pole piece may be made from different elements. In some examples, the tangential permanent magnet portion 23 may be arranged between the upper pole piece 33 and the foot 34.

Optionally, the lateral wings and the foot may be made for example from a solid body of steel and the upper pole piece by a plurality of laminated steel sheets. Consequently, the first 31 and the second lateral wing 32 and the foot 34 may be formed by an extruded or machined body comprising carbon steel. In this way, manufacturing process of the base may be improved. Alternatively, the upper pole piece may be made from a solid body of steel.

The permanent magnets may be made for example from AlNiCo steel (Aluminium-Nickel-Cobalt), rare earth magnetic materials such as neodymium (NdFeB), or samarium-cobalt, but may also be made from for example ceramic materials.

The base 30 may further comprise lateral recesses 39 extending along the axial direction and adapted to receive anchors for fixing the permanent magnet module to a rotor rim. In some examples, the each of the first 31 and the second lateral wing 32 may comprise a lateral recess 39. Suitably shaped anchors (not shown in FIG. 1) may be used for fixing the permanent magnet modules 10 to the rotor rim, e.g. anchors engaging with the surfaces of the recesses when fixed. Alternatively, other fixing systems such as bolting the rotor rim to the upper pole piece 33 may be used.

Figure 2:
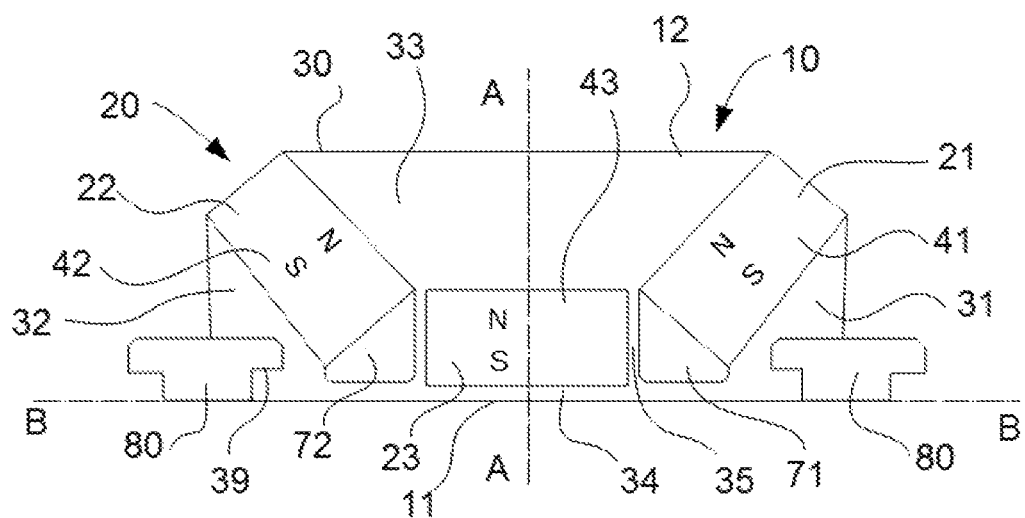
FIG. 2 schematically shows an axial cross-section of a permanent magnet module in accordance to another example.

FIG. 2 schematically shows another example of a permanent magnet module 10. The permanent magnet module 10 for an electrical machine of FIG. 2 extends along an axial direction. The module comprises a permanent magnet assembly 20 comprising at least one permanent magnet and a base 30 supporting at least part of the permanent magnet assembly 20. The base extends from a bottom 11 adapted to be positioned on a rotor of an electrical machine (not shown) to a top 12 along a radial direction (along line A-A). The permanent magnet assembly 20 comprises a first inclined permanent magnet portion 21 and a second inclined permanent magnet portion 22 arranged outwardly inclined along the radial direction (along line A-A) and a tangential permanent magnet portion 23 arranged parallel with respect to a tangential direction (along line B-B), the tangential direction being substantially perpendicular to the radial direction.

In the example of FIG. 2, the permanent magnet assembly 20 includes the first inclined permanent magnet portion 21 comprising a first permanent magnet 41, the second inclined permanent magnet portion 22 comprising a second permanent magnet 42 and a tangential permanent magnet portion 23 comprising a third permanent magnet 43. In addition, the permanent magnet module may comprise several first permanent magnets 41 arranged along the axial direction or second permanent magnets 42 arranged along the axial direction or third permanent magnets 43 along the axial direction. In addition, the permanent magnet module 10 may comprise several first 41 and second 42 and third permanent magnets 43 consecutively arranged along the axial direction. Specifically, the axial length of these magnets may be similar.

In some examples, each or some of the first 21 and second inclined permanent magnet portions 22 and the tangential permanent magnet portion 23 may comprise several permanent magnets. In this way, the tangential permanent magnet portion 23 may comprise several permanent magnets. Furthermore, the permanent magnet module may comprise at several permanent magnet assemblies consecutively arranged along the axial direction.

In the example of the FIG. 2, the permanent magnet module 10 for an electrical machine extends along an axial direction and comprises a first permanent magnet 41, a second permanent magnet 42 and a third permanent magnet 43. In this example, the permanent magnet module 10 further comprises a base supporting at least partially the permanent magnets and extending from a bottom 11 adapted to be positioned on a rotor of an electrical machine to a top 12 along a radial direction; wherein the first permanent magnet 41 and the second permanent magnet 42 are arranged outwardly inclined along the radial direction; and the third permanent magnet 43 is arranged substantially parallel to the tangential direction, the tangential direction being substantially perpendicular to the radial direction.

In some examples, the first and second permanent magnets may be substantially rectangular. In this case, the base may comprise some protrusions placed at the end of the magnets to avoid the detachment of the magnets. Alternatively or additionally, the first permanent magnet 41 and the second permanent magnet 42 may have a substantially trapezoidal cross-section. In this way, the fixation of the magnets to the base is improved and thus the risk of an accidental detachment of such magnets may be reduced.

Additionally, the third permanent magnet 43 may have a rectangular cross-section. In other examples, the third permanent magnet 43 may have a rectangular cross-section with bevelled edges.

The example of FIG. 2 shows a base 30 comprising an upper pole piece 33 and a first lateral wing 31 and a second lateral wing 32. The permanent magnet assembly may be arranged between the upper pole piece 33 and the first lateral wing 31 and the second lateral wing 32. In this example, the upper pole piece 33 has a substantially trapezoidal axial cross-section comprising a long side parallel to a short side and a first lateral side and a second lateral side connecting the long side to the short side. In this example, the third permanent magnet 43 is attached to the short side of the upper pole piece, the first permanent magnet 41 is attached to the first lateral side of the upper pole piece and the second permanent magnet portion 42 is attached to the second lateral side of the upper pole piece.

In this example, the first lateral wing 31 and the second lateral wing 32 have a substantially right triangular cross-section. In this aspect, the first permanent magnet 41 may be arranged between the inclined side of the first lateral wing 31 and one of the inclined side of the upper pole piece 33, and the second permanent magnet 42 of may be arranged between the inclined side of the second lateral wing 32 and the other one of the inclined side of the upper pole piece 33. In this way, the first permanent magnet 41 may be attached to the inclined side of the first lateral wing and to one of the inclined side of the upper pole piece 33 and the second permanent magnet 42 to the other one of the inclined side of the upper pole piece 33. Such an attachment may be for example by gluing or bonding.

In some examples, the base 30 may comprise a foot 34 connecting the first 31 and the second lateral wing 32. In addition, the base may comprise bridges 35 connecting the upper pole piece 33 to the foot 34 or to the first 31 and the second lateral wing 32. In the example of FIG. 2, the third permanent magnet 43 is arranged between the upper pole piece 33 and the foot 34. In this way, the third permanent magnet 43 may be embedded in the base 30, i.e. surrounded by the base, namely in this specific example the bridges 35, the foot 34 and the upper pole piece 33. In these examples the base may be formed by a plurality of laminated steel stacks.

In some examples, the permanent magnet module 10 for an electrical machine extends along an axial direction and comprises a first permanent magnet 41, a second permanent magnet 42 and third permanent magnet 43. The permanent magnet module 10 may comprise a base 30 supporting the permanent magnets. The base 30 may comprise a first lateral wing 31 and a second lateral wing 32, an upper pole piece 33, and a foot 34 connecting the first lateral wing 31 to the second lateral wing 32 and adapted to be positioned on a rotor of an electrical machine. In addition, the base 30 may extend from the foot 33 to the upper pole 33 along a radial direction. The first permanent magnet 41 and the second permanent magnet 42 may be arranged outwardly inclined along the radial direction; wherein the first permanent magnet 41 may be arranged between the first lateral wing 31 and the upper pole piece 33 and the second permanent magnet 42 may be arranged between the second lateral wing 32 and the upper pole piece 33. Additionally, the third permanent magnet 43 may be embedded in the base 30 and positioned between the first permanent magnet 41 and the second permanent magnet 42. Embedded may be defined as inserted into the base 30, i.e. completely surrounded by the base 30. In some examples, the base 30 may further comprise bridges 35 connecting the foot 34 and the upper pole piece 33. In this way, the third permanent magnet 43 may be embedded in the base 30 and surrounded by the foot 34, the bridges 35 and the upper pole piece 33.

As in the FIG. 1, the base may further comprise lateral recesses 39 extending along the axial direction. Shaped anchors 80 may engage the shape of such lateral recesses 39 and then may be used for the fixing the permanent magnet module to the rotor rim. The anchors may be for example T-shaped anchors and may firstly be loosely attached at the circumference of a rotor rim. Then, the permanent magnet module 10 may be inserted and slid between two neighbouring anchors 80. Then, to fix the magnet modules 10 in place, the bolts of the anchors (not shown) may be tightened, so that the anchors press a portion of the base against the circumference of a rotor rim. In some embodiments, the anchors 80 may span the length of the electrical machine. In other embodiments, the anchors may be divided in various segments. Alternatively, permanent magnet modules may be also attached to the rotor by other suitable methods such as welding or bolting.

In some examples, the base may include a cooling channel for cooling the magnets in order to avoid overheating of the magnets that reduces the efficiency of the electrical machine. These channels may allow air circulating in the axial direction to cool the magnets. This air flow circulating along the cooling channels may be active, i.e. air is forced to flow along the cooling channels by for example a fan, or passive, i.e. the air flow is left to flow along the cooling channels without using energy. In addition, the cooling channels may reduce the magnetic bridges formed in the permanent magnet, i.e. magnetic flux circulating from a permanent magnet to the same permanent magnet. The cooling channels may magnetically saturate these bridges and these magnetic fluxes circulating from a permanent magnet to the same permanent magnets may thus be reduced and then the loss of magnetic flux may also be reduced.

In the example of the FIG. 2, the base 30 includes a first cooling channel 71 arranged between the first permanent magnet 41 and the third permanent magnet 43 and a second cooling channel 72 arranged between the second permanent magnet 42 and the third permanent magnet 43.

In some examples, the base may include a first cooling channel 71 arranged between the first permanent magnet portion 21 and the tangential permanent magnet portion 23 and a second cooling channel 72 arranged between the second permanent magnet portion 22 and the tangential permanent magnet portion 23.

Figure 3:
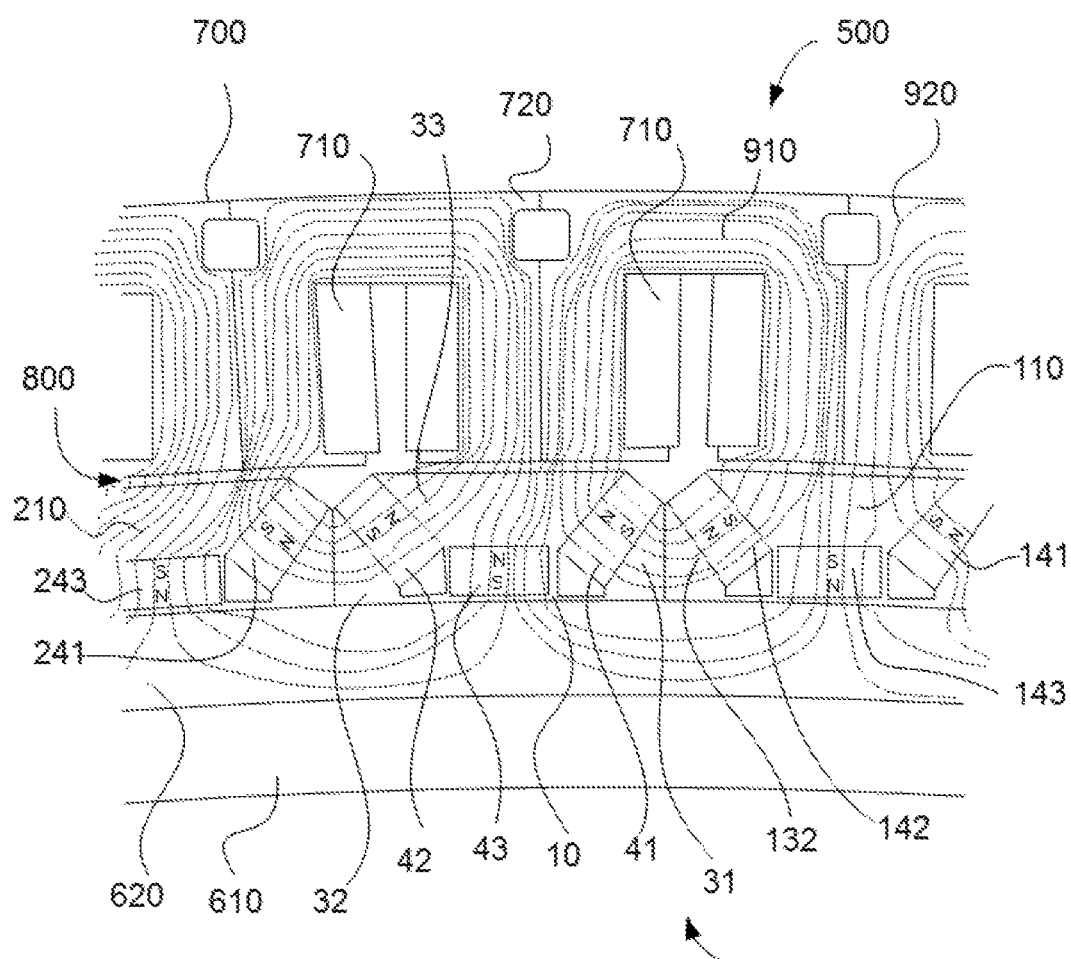
FIG. 3 schematically shows a portion of one example of an electrical machine.

FIG. 3 schematically illustrates a portion of an electrical machine 500 comprising an example of a permanent magnet module 10. The electrical machine 500 of the FIG. 3 comprises a rotor 600, a stator 700 and an air gap 800 arranged between the rotor 600 and the stator 700. In this example, the rotor 600 comprises a rotor body 610 configured for rotating around a central rotational axis, a rotor rim 620 and a plurality of permanent magnet modules (10, 110, 210) attached to the rotor rim 620. In this example, the permanent magnet modules 10 of the FIG. 3 may be similar to those described regarding FIG. 2, although not limited to them. In this way, the permanent magnet extends along an axial direction and comprises a permanent magnet assembly having at least one permanent magnet and a base 30 supporting the permanent magnet assembly and extending from a bottom 11 adapted to be positioned on a rotor 600 of an electrical machine 500 to a top 12 along a radial direction.

An air gap 800 is formed between the outer circumference of the rotor 600 and the stator 700. In some examples, the stator 700 may comprise a plurality of coils or windings 710 wound around teeth 720. Additionally, the stator may comprise winding modules. As the rotor rotates, the magnetic field generated by the permanent magnets causes a varying magnetic field in the windings, which causes an electrical current in the windings 710.

In the example of FIG. 3, the permanent magnet assembly includes a first inclined permanent magnet portion having a first permanent magnet 41, a second permanent magnet portion having a second permanent magnet 42 and a tangential permanent magnet portion having a third permanent magnet 43. The modules may comprise several permanent magnet assemblies arranged along the axial direction.

In some examples, the base may comprise an upper pole piece 33 and a first lateral wing 31 and a second lateral wing 32.

According to the example of FIG. 3, the North of each of the permanent magnets of the first permanent magnet module 10 is oriented towards the stator 700 (or towards the upper pole piece 33 of the base), while the magnet orientation of the neighbouring permanent magnet modules 110 or 210 is the opposite, i.e. the South of each of the magnets is arranged facing towards the stator 700. In other examples, when the portions of the permanent magnet assembly do not correspond to a permanent magnet in each portion, e.g. having a single permanent magnet along the all the cross-sectional portions of the permanent magnet assembly, the magnet orientation may be similar.

In FIG. 3, magnetic flux lines are indicated by discontinuous lines. In this example, magnetic lines 910 circulate from the South of the first permanent magnet 41 of the first module 10 to the North of the second permanent magnet 142 of the second module 110 and from the South of the second permanent magnet 142 of the second module 110 to the North of the first permanent magnet 41 of the first module 10 enclosing the windings 710 of the stator. In this way, magnetic lines may flow from one inclined permanent magnet portion of one module to the inclined permanent magnet portion of the adjacent module, e.g. from the first permanent magnet 41 to the second permanent magnet 142, directly passing through the first lateral wing 31 and the second lateral wing 132 in a substantially tangential direction. In some examples, there might be a gap between modules for facilitating the manufacturing of the electrical machine. In these examples, some of the magnetic lines 910 may circulate from one module to the other one through the rotor rim rather than directly through the first lateral wing 31 to the second wing lateral wing 132.

In addition, as the module comprises a permanent magnet assembly having a tangential permanent magnet portion, the concentration of magnetic flux lines are increased. In this aspect, the third permanent magnet 43 improves the magnetic flux, since additional magnetic lines 920 are formed. Additional magnetic lines 920 flow from South of the third permanent magnet 43 of the first module 10 to the North of the third permanent 143 of the second module 110 through the rotor rim 620 and from the South of the third permanent magnet 143 of the second module 110 to the North of the third permanent magnet 43 of the first module 10 enclosing the windings 710 of the stator. In some examples, some of the additional magnetic lines may alternatively be directed from the South of the third permanent magnet 43 to the North of the second permanent magnet 142.

In these examples, the upper pole piece 33 acts as flux concentrator since the magnetic lines flow from the stator to the magnets through the upper pole piece 33. In this way, magnets have a tangential or circumferential flux orientation. Such an orientation provides beneficial power and torque characteristics to the electrical generator.

The permanent magnet modules may have a length that substantially corresponds to the axial length of the electrical machine, e.g. a generator or motor; each permanent magnet module thus spans substantially the entire length of the electrical machine. In other embodiments, the length of a module may be substantially half of the axial length of the electrical machine; two permanent magnet modules span the length of the electrical machine. In these cases, one module may be inserted from the front and one module may be inserted from the rear.

The electrical machine 500 depicted in FIG. 3 may be a permanent magnet generator, and specifically permanent magnet generator for a wind turbine.

Figure 4:
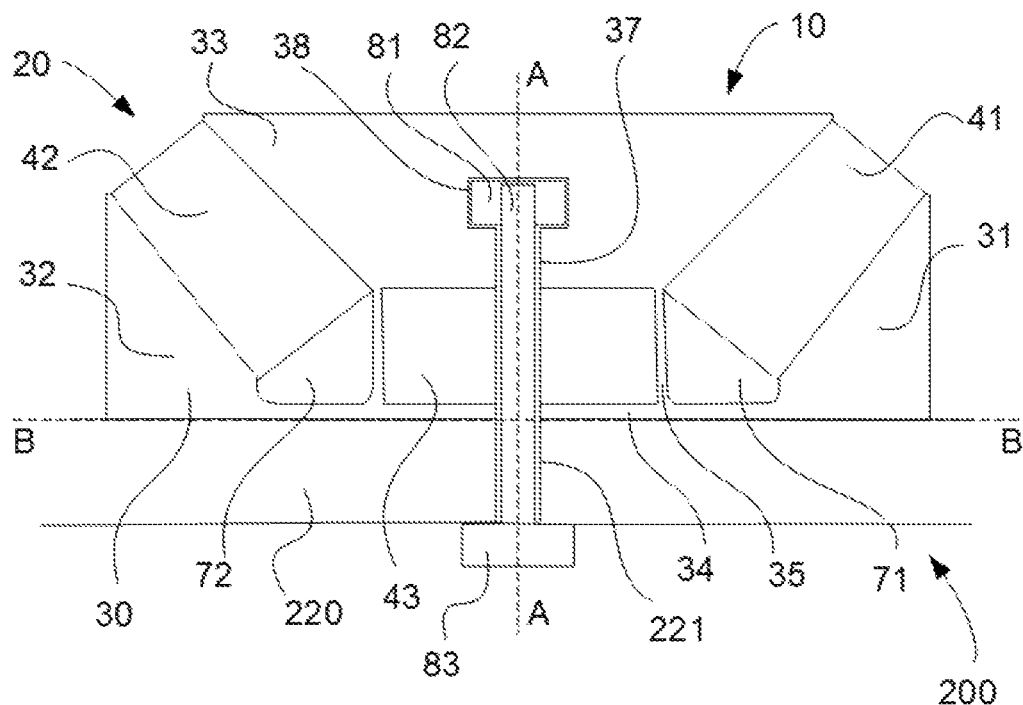
FIG. 4 illustrates an axial cross-section of a permanent magnet module in accordance to another example.

FIG. 4 schematically shows another example of a permanent magnet module 10. The permanent magnet module 10 illustrated in FIG. 4 extends along an axial direction and comprises a first 41 and a second 42 a third permanent magnet 43. The module 10 further comprises a base 30 supporting such permanent magnets and extending from a bottom adapted to be positioned on a rotor 600 of an electrical machine 500 to a top along a radial direction (along line A-A in this example). The first permanent magnet 41 and the second permanent magnet 42 are outwardly inclined along the radial direction and the third permanent magnet 43 is substantially parallel to the tangential direction.

Similar to the example of the FIG. 2, the base 30 may comprise an upper pole piece 33 and a first lateral wing 31 and a second lateral wing 32. In this example, the base further includes a foot 34 connecting the lateral wings and bridges 35 connecting the upper pole piece 33 and the foot 34. In this way, the first permanent magnet 41 may be arranged between the upper pole piece 33 and the first lateral wing 31; the second permanent magnet 42 may be arranged between the upper pole piece 33 and the second lateral 32 and the third permanent magnet 43 may be arranged between the upper pole piece 33 and the foot 34. In this way, the third permanent magnet 43 is embedded in the base 30.

In some examples, the base may include a first cooling channel 71 arranged between the first permanent magnet 41 and the third permanent magnet 43 and a second cooling channel 72 arranged between the second permanent magnet 42 and the third permanent magnet 43.

In FIG. 4 an alternative example of the attachment of the module 10 to the rotor rim 620 is also shown. In this way, the upper pole piece 33 may include an axial hole 38 in which a fixation bar 81 may be inserted. A plurality of radial holes 37, at different axial positions, may be drilled in the base. Fixation bar 81 may comprise a number of transverse through-holes, such that when the fixation bar 81 is inserted, the transverse through-holes are lined up with the radial holes 37 of the base. Similarly, the rotor rim 620 may further comprise a number of radial through-holes 621 that may be lined up with the radial holes 37 of the base. Bolts 82 with nuts 83 may be inserted in the radial holes of the rotor rim 621 and in the radial holes of the base 37 and may extend into and beyond the transverse holes of the fixation bar 81, into the upper pole piece 33. The permanent magnet module 10 may thus be attached to the rotor rim 620.

In some examples, radial holes 37 may extend from the axial hole 38 of the upper pole piece 33 through the foot 34. In some examples, the tangential permanent magnet portion of the permanent magnet assembly, e.g. the third permanent magnet 43, may comprise radial holes in such a way that the bolt 82 may extend beyond the tangential permanent magnet portion to the axial hole 38 of the upper pole piece 33.

Alternatively, instead of drilling the tangential permanent magnet portion of the permanent magnet assembly, a gap between two axially consecutive tangential permanent magnet portion may be left, in such a way that the bolt 82 may extend from the rotor rim 620 to the fixation bar 81. In this way, the permanent magnet module may comprise several third permanent magnets 43 arranged along consecutively along the axial direction having a gap between two consecutive third permanent magnets allowing the bolt 82 to be inserted.

Figure 5:
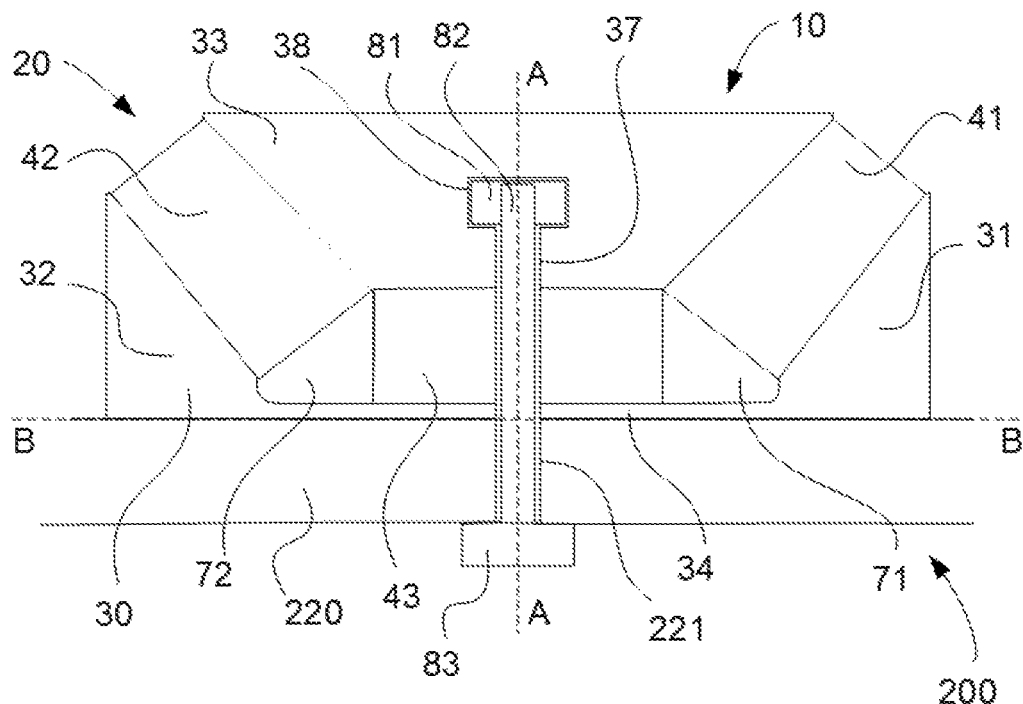
FIG. 5 illustrates a further example of an axial cross-section of a permanent magnet module.

Permanent magnet module 10 illustrated in FIG. 5 is similar to that illustrated in FIG. 4. However, the module of FIG. 5 does not comprise bridges 35 connecting the upper pole piece to the foot 34. In this way, the first lateral wing 31, the second lateral wing 32 and the foot 34 may be independent of the upper pole piece 33, i.e. the base may be formed by two separated parts extending along the axial direction.

In the example of FIG. 5, the first permanent magnet 41 is attached, e.g. by gluing, to the inclined surface of the first lateral wing 31 and to one of the inclined surface of the upper pole piece 33, and the second permanent magnet 42 is attached to the inclined surface of the second lateral wing 32 and to the other one of the inclined surface of the upper pole piece 33. In addition, the first lateral wing 31 may be connected to the upper pole piece 33 through the first permanent magnet 41 and the second lateral wing 32 may be connected to the upper pole piece 33 through the second permanent magnet 42.

In some examples, the first inclined permanent magnet portion of the permanent magnet assembly may be attached to the inclined surface of the first lateral wing 31 and to one of the inclined surface of the upper pole piece 33, and the second inclined permanent magnet portion of the permanent magnet assembly may be attached to the inclined surface of the second lateral wing 32 and the other one of the inclined surface of the upper pole piece 33. In addition, the first lateral wing 31 may be connected to the upper pole piece 33 through the first inclined permanent magnet portion of the permanent magnet assembly and the second lateral wing 32 may be connected to the upper pole piece 33 through the second inclined permanent magnet portion of the permanent magnet assembly. Furthermore, the lateral wings and the foot 34 may be clamped between the upper pole piece 33 and the rotor rim 620 when a bolt 82 extending from the rotor rim 620 to the fixation bar 81 inserted in the upper pole piece 33. Such an attachment may reduce the risk that a magnet may be released since adhesive failures are counteracted by the pressure force exerted by the upper pole piece 33.

In this aspect, permanent magnet modules may comprise a base split into two separated parts. The upper pole piece 33 may not be directly connected to the foot 34 or to the first 31 or second lateral wing 32, i.e. the upper pole piece may be independent from the other parts of the base.

In this way, as bridges connecting the upper pole piece to the other parts of the base are avoided, losses of magnetic flux may be reduced and thus the efficiency may be increased. The loss of magnetic flux is caused by magnetic flux lines from the magnet closing on the same magnet. Only the magnetic flux lines that reach the stator can provoke an electrical current.

In addition, splitting the base in two different parts allows using different materials in each of these parts. In some examples, the first 31 and the second lateral wing 32 may be made from a first material and the upper pole piece 33 may be made from a second material, wherein the first material is different from the second material. Specifically, the first material is carbon steel and the second material is laminated steel. In this way, the upper portion may be formed as a stack of metal sheets which may be separated from each other by means of electrically insulating material. In some examples, the first 31 and the second lateral wing 32 and the foot 34 may be formed by an extruded or machined body. In this way, manufacturing process of the base may be improved.

Alternatively, the first lateral wing 31 and the second lateral wing 32 may be formed as a stack of metal sheets in a similar way than the upper pole piece 33. However, thicknesses of the sheets or gaps between the sheets may be different to those of the upper portion 33.

Figure 6:
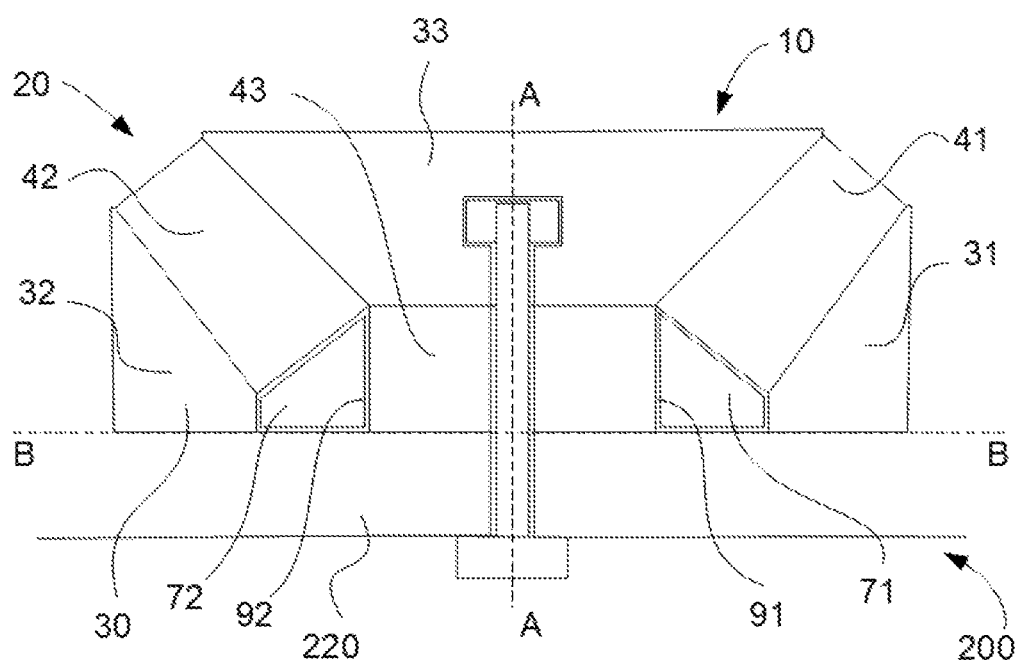
FIG. 6 shows another example of an axial cross-section of a permanent magnet module.

FIG. 6 shows a further example of a permanent magnet module. In this example, the first lateral wing 31 is connected to the third permanent magnet 43 through a first connecting profile 91. Such a first connecting profile 91 may be a tubular profile having a parallelepiped cross-section. In this way, one side of the profile is attached, e.g. glued or joined by a resin, to the first lateral wing 31 and the opposite side of the profile is attached, e.g. glued or joined by a resin, to the third permanent magnet 43. The first connecting profile 91 may further comprise an inclined side arranged between the sides attached to first lateral wing 31 and the third permanent magnet 43, respectively. Such an inclined side may be attached to the first permanent magnet 41. The first connecting profile 91 further encloses the first cooling channel 71. The module of the FIG. 6 similarly comprises a second connecting profile 92 connecting the second lateral wing 32 to the third permanent magnet 43. The inclined side of the second connecting profile 92 may be connected to the second permanent magnet 42. In a similar way, the second connecting profile 91 may further enclose the second cooling channel 72.

In this example, the first 31 and the second lateral wing 32 are made from a first material and the upper pole piece is made from a second different material For example, the first 31 and the second lateral wing 32 may made from steel body, e.g. carbon steel, i.e. the first material may be carbon steel, and the upper pole piece 33 from a stack of metal sheets, e.g. laminated steel, i.e. the second material may be laminated steel. Additionally the first 91 and the second connecting profile 92 may be made from an extruded profile of aluminium. Aluminium is a material having a low magnetic conductivity and relatively high thermal conductivity. In this aspect, connecting profiles made from aluminium may minimize magnetic losses and improve the cooling behaviour of the module.

In some examples, the first lateral wing 31 may be connected to the upper pole piece 33 through the first inclined permanent magnet portion of the permanent magnet assembly and the second lateral wing 32 may be connected to the upper pole piece 33 through the second inclined permanent magnet portion of the permanent magnet assembly.

In addition, the first 31 and the second lateral wing 32 and the upper pole piece 33 of the base may be made from different materials, specifically the upper pole piece 33 may comprise laminated steel and the first 31 and the second lateral wing 32 may comprise carbon steel.

In some examples, the base 30 may further comprise a first 91 and a second connecting profile 92. The first connecting profile 91 may connect the first lateral wing 31 and the first inclined permanent magnet portion of the permanent magnet assembly, e.g. a first permanent magnet 41, to the tangential permanent magnet portion of the permanent magnet assembly, e.g. a third permanent magnet 43. The second connecting profile 92 may connect the second lateral portion 32 and the second inclined permanent magnet portion of the permanent magnet assembly, e.g. a second permanent magnet 42, to the tangential permanent magnet portion of the permanent magnet assembly, e.g. a third permanent magnet 43.

In this example, the module may be fixed to the rotor rim 620 in a similar way as explained with respect to the FIG. 5.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

This written description uses examples to disclosure the invention, including the preferred embodiments, and also to enable any person skilled in the art to practice the invention, including making an dusing any devices or systems and performing any incorporated methods. The patentable scope of the invention is defined by the claims, and may include other examples that occur to those skilled in the art. Such other examples are intedend to be within the scope of the claims if they have structural elements that do not differ from the literal language of the claims, or if they include equivalent structural elements with insubstantial differences from the literal languages of the claims.

What we claim is:

1. A permanent magnet module for an electrical machine extending along an axial direction, comprising:
   a permanent magnet assembly comprising at least one permanent magnet;
   a base supporting at least part of the permanent magnet assembly and extending from a bottom adapted to be positioned on a rotor of an electrical machine to a top along a radial direction, the base comprising an upper pole piece, a first lateral wing, a second lateral wing, the permanent magnet assembly being arranged between the upper pole piece and the first and second lateral wings, wherein the first lateral wing and the second lateral wing are made from a first material and the upper pole piece of the base is made from a second material, wherein the first material is different from the second material, wherein the permanent magnet assembly further comprises:
   a first inclined permanent magnet portion and a second inclined permanent magnet portion arranged outwardly inclined along the radial direction;
   a tangential permanent magnet portion arranged substantially parallel to a tangential direction, the tangential direction being substantially perpendicular to the radial direction.

2. The permanent magnet module according to claim 1, wherein the permanent magnet assembly comprises a single permanent magnet in an axial cross-section including the tangential permanent magnet portion and the first and the second inclined permanent magnet portions.

3. The permanent magnet module according to claim 1, wherein the permanent magnet assembly further includes:
   the first inclined permanent magnet portion comprising a first permanent magnet;
   the second inclined permanent magnet portion comprising a second permanent magnet;
   the tangential permanent magnet portion comprising a third permanent magnet.

4. The permanent magnet module according to claim 3, wherein the first permanent magnet and the second permanent magnet have a substantially trapezoidal cross-section.

5. The permanent magnet module according to claim 3, wherein the base includes:
   a first cooling channel arranged between the first permanent magnet and the third permanent magnet;
   a second cooling channel arranged between the second permanent magnet and the third permanent magnet.

6. The permanent magnet module according to claim 3, wherein the base comprises bridges connecting the foot and the upper pole piece.

7. The permanent magnet module according to claim 1, wherein the upper pole piece has a substantially trapezoidal axial cross-section comprising a long side parallel to a short side and a first lateral side and a second lateral side connecting the long side to the short side, wherein the tangential permanent magnet portion is attached to the short side of the upper pole piece; and the first inclined permanent magnet portion is attached to the first lateral side of the upper pole piece; and the second inclined permanent magnet portion is attached to the second lateral side of the upper pole piece.

8. The permanent magnet module according to claim 7, wherein the first lateral wing is connected to the upper pole piece through the first lateral inclined permanent magnet portion and the second lateral wing is connected to the upper pole piece through the second lateral inclined permanent magnet portion.

9. The permanent magnet module according to claim 1, wherein the first material is carbon steel and the second material is laminated steel.

10. The permanent magnet according to claim 1, wherein the base comprises a foot connecting the first lateral wing and the second lateral wing.

11. The permanent magnet according to claim 10, wherein the base further comprises bridges connecting the upper pole piece to the foot.

12. The permanent magnet according to claim 1, wherein the base further comprises a first and a second connecting profile, wherein
   the first connecting profile connects the first lateral wing and the first inclined permanent magnet portion of the permanent magnet assembly to the tangential permanent magnet portion of the permanent magnet assembly, and
   the second connecting profile connects the second lateral wing and the second inclined permanent magnet portion of the permanent magnet assembly to the tangential permanent magnet portion of the permanent magnet assembly.

13. The permanent magnet module according to claim 1, wherein the upper pole piece comprises an axial hole adapted to receive a fixation bar and the base comprises a plurality of radial holes, and wherein the permanent magnet module is configured in such a way that the permanent magnet module can be fixed to a rotor rim by a plurality of bolts inserted in the radial holes and fixed to the fixation bar.

14. The permanent magnet according to claim 1, wherein the base comprises lateral recesses extending along the axial direction and adapted to receive anchors for fixing the permanent magnet module to a rotor rim.

15. The permanent magnet according to claim 1, wherein the permanent magnet module comprises at least two permanent magnet assemblies consecutively arranged along the axial direction.

16. The permanent magnet module according to claim 1, wherein the base includes:
   a first cooling channel arranged between the first permanent magnet and the third permanent magnet; and
   a second cooling channel arranged between the second permanent magnet and the third permanent magnet.

17. An electrical machine comprising a stator, a rotor and an air gap arranged between the rotor and the stator, the rotor comprising:
   a rotor body configured for rotating around a central rotational axis and comprising a rotor rim; and
   a plurality of permanent magnet modules according to claim 1 attached to the rotor rim.

18. A permanent magnet module for an electrical machine extending along an axial direction, comprising:
   a first permanent magnet;
   a second permanent magnet;

a third permanent magnet;

a base supporting the first, second, and third permanent magnets and extending from a bottom adapted to be positioned on a rotor of an electrical machine to a top along a radial direction, the base comprising an upper pole piece, a first lateral wing, a second lateral wing, the first lateral wing and the second lateral wing being made from a first material and the upper pole piece of the base is made from a second material, wherein the first material is different from the second material, and wherein the first permanent magnet and the second permanent magnet are arranged outwardly inclined along the radial direction, and wherein the third permanent magnet is arranged substantially parallel to the tangential direction, the tangential direction being substantially perpendicular to the radial direction.

19. A permanent magnet module for an electrical machine extending along an axial direction, comprising:

a first permanent magnet, a second permanent magnet and a third permanent magnet;

a base supporting the first, second, and third permanent magnets, the base comprising:

a first lateral wing and a second lateral wing, the first lateral wing and the second lateral wing being made from a first material;

an upper pole piece, the upper pole piece of the base is made from a second material, the first material being different from the second material; and a foot connecting the first lateral wing to the second lateral wing and adapted to be positioned on a rotor of an electrical machine; the base extending from the foot to the upper pole piece along a radial direction, wherein the first permanent magnet and the second permanent magnet are arranged outwardly inclined along the radial direction, wherein the first permanent magnet is arranged between the first lateral wing and the upper pole piece and the second permanent magnet is arranged between the second lateral wing and the upper pole piece, and wherein the third permanent magnet is embedded in the base and positioned between the first and the second permanent magnets in a tangential direction that is parallel to the axial direction.

* * * * *